US010789392B2

(12) United States Patent
Kupiec et al.

(10) Patent No.: US 10,789,392 B2
(45) Date of Patent: Sep. 29, 2020

(54) SYSTEM AND METHOD FOR ADMINISTERING PHYSICAL SECURITY ACCESS TO COMPONENTS OF A PROCESS CONTROL SYSTEM

(71) Applicant: ABB Schweiz AG, Baden (CH)

(72) Inventors: Ronald A. Kupiec, Chagrin Falls, OH (US); Martin G. Hermes, Cleveland Heights, OH (US)

(73) Assignee: ABB Schweiz AG, Baden (CH)

( * ) Notice: Subject to any disclaimer, the term of this patent is extended or adjusted under 35 U.S.C. 154(b) by 259 days.

(21) Appl. No.: 15/701,225

(22) Filed: Sep. 11, 2017

(65) Prior Publication Data

US 2018/0012043 A1    Jan. 11, 2018

Related U.S. Application Data

(63) Continuation of application No. PCT/US2016/021734, filed on Mar. 10, 2016.
(Continued)

(51) Int. Cl.
*G06F 21/86* (2013.01)
*G06F 21/88* (2013.01)
(Continued)

(52) U.S. Cl.
CPC .............. *G06F 21/86* (2013.01); *G06F 21/88* (2013.01); *G07C 9/00309* (2013.01); *G07C 9/00571* (2013.01); *H04L 63/0428* (2013.01); *H04L 63/10* (2013.01); *G07C 2009/00365* (2013.01); *G07C 2009/00412* (2013.01); *G07C 2209/64* (2013.01)

(58) Field of Classification Search
CPC combination set(s) only.
See application file for complete search history.

(56) References Cited

U.S. PATENT DOCUMENTS 3,356,906 A    12/1967 Lamb et al.
4,631,634 A    12/1986 Raabe et al.
(Continued)

FOREIGN PATENT DOCUMENTS

CN    204060321 U    12/2014
EP    1612741    *  4/2006    ............... G07C 9/00
WO    2012/047850 A2    4/2012

OTHER PUBLICATIONS

International Search Report issued in International application No. PCT/US2016/021734, dated Jul. 26, 2016 (4 pages).
(Continued)

*Primary Examiner* — Christopher M Crutchfield
(74) *Attorney, Agent, or Firm* — Taft Stettinius & Hollister LLP; J. Bruce Schelkopf

(57) ABSTRACT

A system for restricting physical access to at least one component process control system component has a locking device that is integrated with process control system security administration data. The locking device accesses the process control system security data when authenticating a user. Upon authentication of a user for physical access to the particular process control component, the user may directly access the component for which the user is authorized. The system provides tracking of all authenticated users and attempts to access the various control system components.

13 Claims, 4 Drawing Sheets

Related U.S. Application Data

(60) Provisional application No. 62/130,755, filed on Mar. 10, 2015.

(51) Int. Cl.
    *G07C 9/00*         (2020.01)
    *H04L 29/06*     (2006.01)

(56) References Cited

U.S. PATENT DOCUMENTS

| | | | |
|---|---|---|---|
| 6,008,459 A | 12/1999 | Faber et al. | |
| 6,274,833 B1 | 8/2001 | Moody | |
| 6,278,605 B1 | 8/2001 | Hill | |
| 2004/0151353 A1* | 8/2004 | Topping | G06K 9/00006 382/124 |
| 2005/0099288 A1* | 5/2005 | Spitz | G07C 9/28 340/506 |
| 2007/0028119 A1* | 2/2007 | Mirho | G07C 9/257 713/189 |
| 2008/0109883 A1* | 5/2008 | Hernoud | H04L 63/20 726/5 |
| 2009/0070571 A1* | 3/2009 | Neely | G07C 9/32 713/1 |
| 2012/0280783 A1* | 11/2012 | Gerhardt | G07C 9/00309 340/5.6 |
| 2013/0125231 A1 | 5/2013 | Kuenzi | |
| 2014/0088979 A1* | 3/2014 | Garman | G06Q 10/0631 705/1.1 |
| 2014/0123273 A1 | 5/2014 | Matus | |
| 2014/0337930 A1* | 11/2014 | Hoyos | H04L 63/10 726/4 |

OTHER PUBLICATIONS

Written Opinion issued in International application No. PCT/US2016/021734, dated Jul. 26, 2016 (8 pages).

International Preliminary Report on Patentability issued in International application No. PCT/US2016/021734, dated Sep. 12, 2017 (9 pages).

International Search Report and Written Opinion, PCT/US2016/029360, ABB Technology AG, Jun. 23, 2016, 12 pages.

* cited by examiner

SYSTEM AND METHOD FOR ADMINISTERING PHYSICAL SECURITY ACCESS TO COMPONENTS OF A PROCESS CONTROL SYSTEM

TECHNICAL FIELD

The present disclosure generally relates to a system for restricting physical access to components of a process control system.

BACKGROUND

Process control systems have user authentication that prevents unauthorized users from accessing the system software to make changes to data or parameters, such as set points. However, most of the physical equipment associated with the process control system is in a single location. When a user is authorized to access this single location, all process control system components, including the associated communications equipment are often available to the user.

In other installations, each component of the control system may be locked in a separate enclosure. The cabinets may all share a common key or require different keys for access. Therefore, there is a need in the art for improved management of the physical security of process control system components.

SUMMARY

A system for administering physical access to at least one component of a process control system has an electronic lock for restricting access to an enclosure containing the at least one component by associating a physical access permission with an enclosure and providing a first level of user authentication, a communication API for transmitting open and close requests between an asset management component of the control system and the electronic lock, an access management component for managing user roles and associated permissions in the process control system, and wherein the asset management component of the process control system for provides a second level of user authentication by comparing the electronic lock physical access permission with process control system permissions defined in the access management component to determine whether a user is granted or denial permission to contents of the respective enclosure.

A method for controlling access to at least one physical component of a process control system is provided. The method has the following steps: receiving user credentials by an electronic lock installed with an enclosure housing at least one component of the process control system; transmitting the user credentials and lock address from the electronic lock to an asset management component of the process control system; requesting user granted permissions by the asset management component from the process control system access management component; identifying the enclosure by using the locking system network address; receiving physical access permissions of the enclosure by the asset management component from the electronic lock; validating by the asset management component whether the physical access permissions are equivalent to the user permissions in the control system; and providing access to at least one component inside the enclosure if the user is validated for access to the enclosure contents, and preventing access if the user is not validated for access to the enclosure.

Further, the tracking of issues back to individuals accessing the control system enclosure at the time of an issue with the corresponding at least one physical component of the process control system is provided.

BRIEF DESCRIPTION OF THE FIGURES

In the accompanying drawings, structural embodiments are illustrated that, together with the detailed description provided below, describe exemplary embodiments of a system for restricting access to process control components. One of ordinary skill in the art will appreciate that a component may be designed as multiple components or that multiple components may designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION OF THE ILLUSTRATIVE EMBODIMENTS

Figure 1:
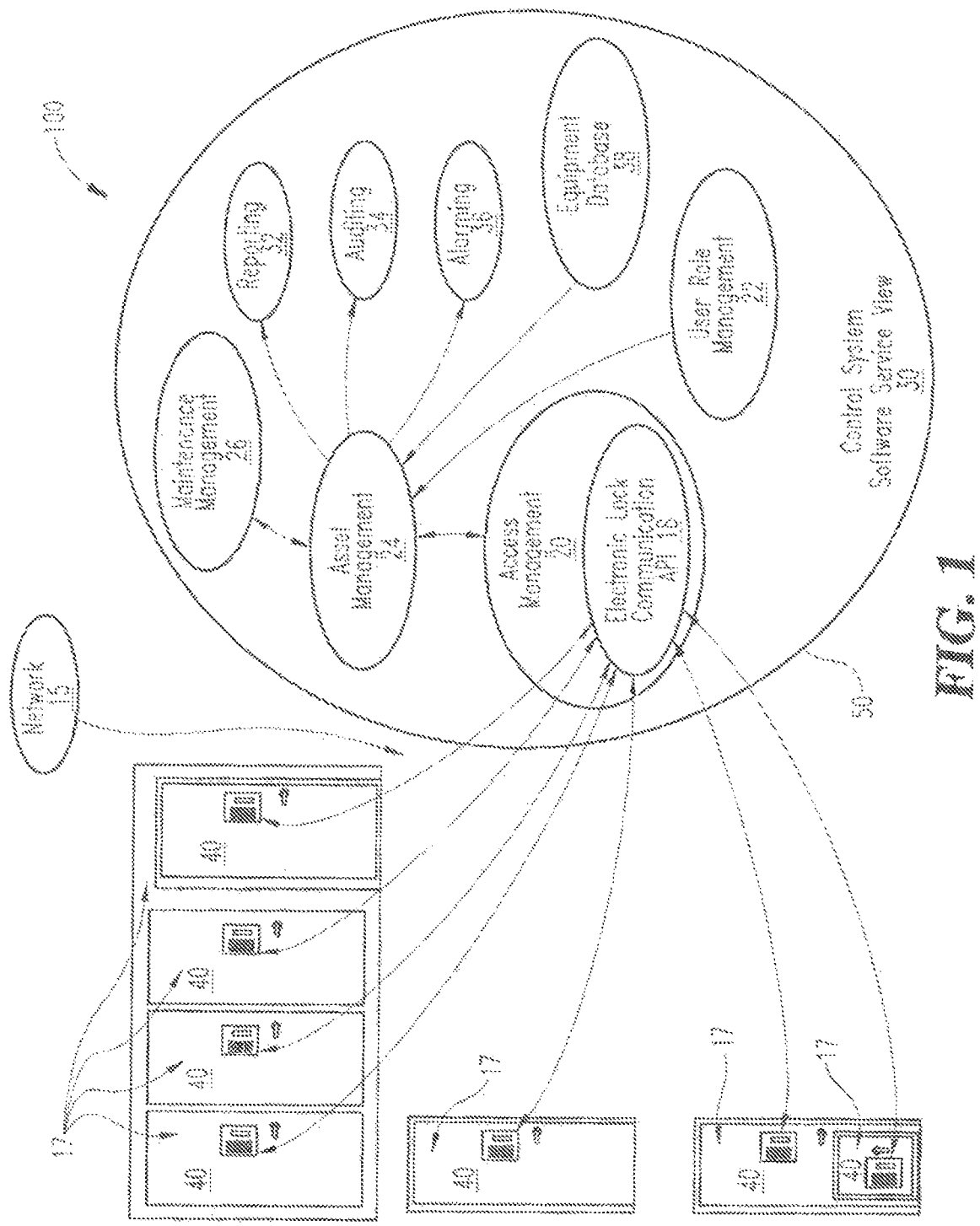
FIG. 1 is a schematic of electronic locks in communication with components of a process control system.

With reference to FIG. 1, a system 100 for integrating physical access security configuration, monitoring and reporting with the access management component 20 of a process control system 50 is shown. The system 100 has at least one electronic lock 40 or 40*a* (FIGS. 2-4), a communication Application Programming Interface (API) 18 and a process control system 50 having software components such as asset management 24, access management 20, user role management 22, maintenance management 26 and an equipment database 38.

The process control system 50 is a districted control system or another system for managing manufacturing processes such as chemical, pharmaceutical, power generation and power distribution processes as well any other applicable process. One example of a process control system 50 that may be used with the present disclosure is the 800xA system that is commercially available. The process control system 50 has software 30 for managing equipment and processes and hardware in the form of at least one physical component 19 (FIGS. 2-4) such as servers, network equipment, controllers, transmitters, field devices, final control elements, and wiring components. The control system 50, control system software components 20, 22, 24, 26, 38, and electronic lock 40 or 40*a* (FIGS. 2-4) have non-transitory computer readable program code for execution by a processor on a computer readable medium for carrying out the steps of linking physical security access to an enclosure containing contents that are accessible to a user according to the job function of the respective user and the contents of the enclosure 17. The enclosure 17 can be the single location or alternatively located in the single location, the single location being a room in a building. Alternatively, the enclosure 17 can be located in an outdoor environment. Furthermore one or more additional (secondary, tertiary, etc.) enclosures 17 can be located or otherwise disposed within an enclosure 17. In some embodiments each of the additional enclosures 17 may also have a computer component located therein such as a component of a process control system 50. Further, each of the enclosures 17 may include an electronic lock 40 with a set of permissions associated therewith that may be differentiated relative to one another. Each of the computer components are accessible only when permissions associated with a user's credentials correspond with the permissions defined by an electronic lock 40 for the associated enclosure 17.

The asset management component 24 interfaces with the reporting 32, auditing 34, alarming 36 sub-components of the process control system 50. The asset management component 24 of the process control system 50 has an equipment database 38 for storing the identity of the enclosure, IP (internet protocol) address of the electronic lock securing the enclosure, enclosure type, and other data about equipment in an installed base, such as a set of equipment installed across an organization. By way of non-limiting example, enclosure types are controller, termination, networking, servers, motor control, safety system, and power distribution enclosures. It should be understood that other enclosure types are possible depending on the installation.

The access management component 20 in the process control system 50 ties physical components such as the enclosure 17, at least one component inside the enclosure, and the electronic lock 40 to logical representations 17a, 40a of the physical components within the control system 50. The asset management component 24 24 manages the logical representations of the equipment and is in communication with the user role management component 22.

The user role management component 22 contains the definitions of the various roles in the system 100, such as the permissions to be described in further detail below. The interface between the asset 24 and user role management components 22 allows for the synchronization of changes in the user role database management component 22 with access management 20 device lists. Further, the asset management component 24 interfaces with the equipment database 38 to coordinate the grouping of the process control system 50 hardware components 19 with the appropriate access control device, such as electronic lock 40, and enclosure 17.

Figure 2:
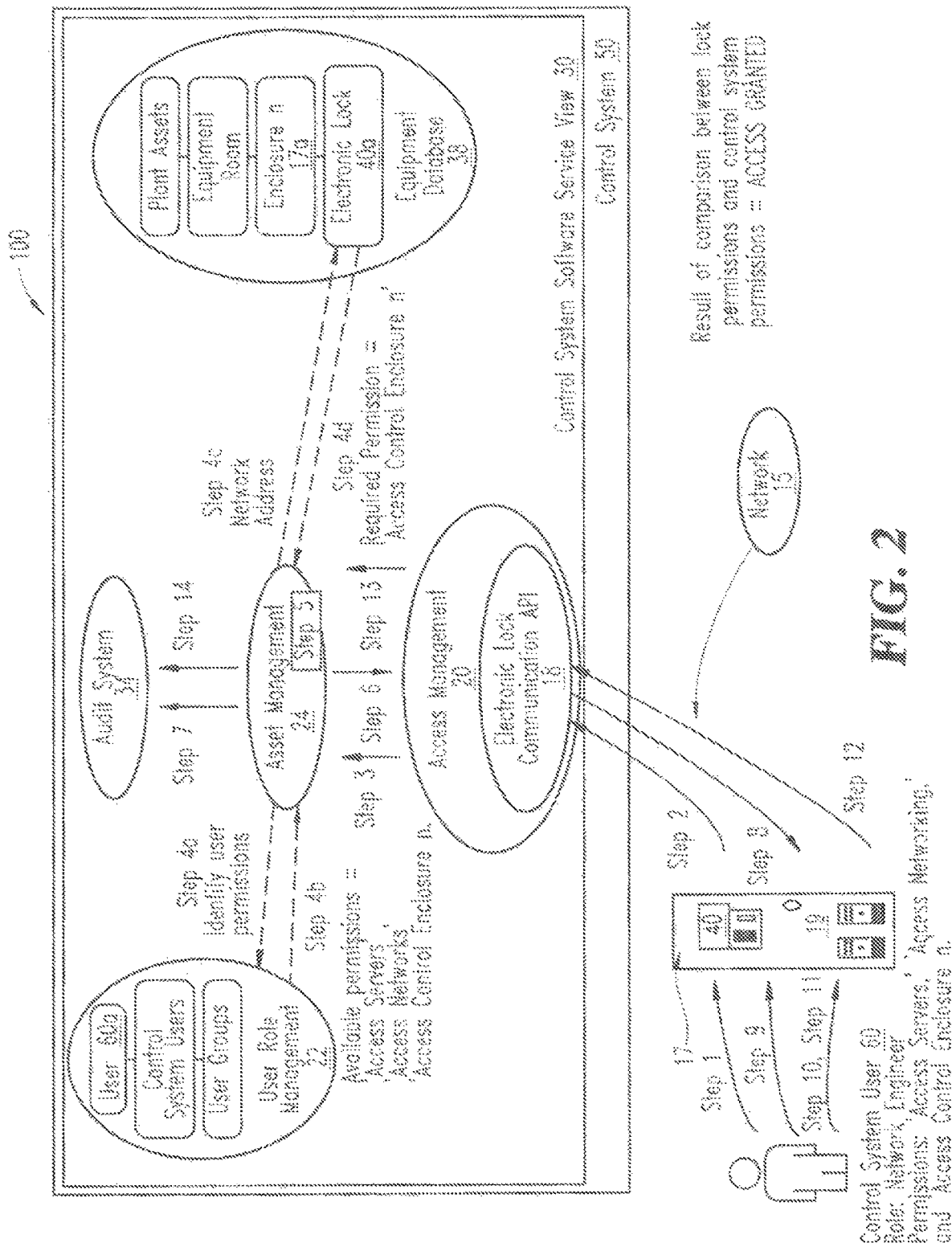
FIG. 2 is a schematic of a system for integrating physical access security with a process control system in which a user is granted access to an enclosure housing of at least one process control system physical component.

User authentication occurs at a first level when a user 60 attempts to access an enclosure 17 or cabinet at step 1 shown in FIG. 2. The enclosure 17 housing at least one control system component 19 has an electronic lock 40. The user may present credentials to the electronic lock 40 such as an ID card having HID or HID iCLASS proximity, a magnetic strip, key fob, RFID credentials or an embedded chip. Alternatively the user is authenticated by entering a PIN code, voice recognition, or biometric information such as that obtained using a fingerprint, finger vein, or palm vein scanner for entry into the enclosure 17. It should be understood that the above authentication means are provided by way of non-limiting examples.

The electronic lock 40 can include a memory, a controller, and a microprocessor circuit to receive the user authentication information and communicate the identity of the user 60a to the asset management component 24 of the process control system 50. In ore embodiment, the electronic lock 40 can transmit the user ID and Network address of the electronic lock 40 installed with the enclosure 17 to the asset management component 24 of the process control system 50.

An example of an electronic lock 40 suitable for use with the physical access control system 100 of the present disclosure is sold under the trademarks LockView® 4 CompX eLock® 200 of 300 series available from CompX® Security Products of Grayslake, Ill. It should be understood that other electronic locks 40 may be suitable for use with the present disclosure and that the above products are provided by way of non-limiting example.

The electronic lock 40 can be mounted on or located in proximity to the respective enclosure housing 17 of at least one control system physical component 19, network switches, network servers and communication equipment. The control system components 19 may be grouped together, such as a basic controller consisting of a power supply module, a controller, and local I/O modules, that are housed in a single enclosure 17. Alternatively, a large system has several controllers that communicate over an Ethernet-based control network and are housed in a single enclosure or multiple enclosures 17. An example of a controller that may be employed in the present system 100 is the AC 800M controller that is available commercially.

When a user 60a attempts to access an enclosure 17 using one of the above mentioned authentication means or another means, the electronic lock 40 then contacts the control system 50 with an open request at step 2. Further, at step 3, a communication API 18 associated with the electronic lock 40 sends an open request over the network 15 utilizing a wireless or wired protocol at step 2. By way of non-limiting example, the wireless protocol can be IEEE 802.11, CDMA, or GSM and the wired protocol can be wired Ethernet, RS232, RS485, or IEEE 802.3.

As is well known, application programming interfaces, such as communication API 18, are often software frameworks or libraries that include specifications for routines, data structures, object classes, and variables. In one embodiment, the communication API 18 is an implementation of a protocol for communication between the asset management component 24 of the process control system 50 and the electronics of the electronic lock 40.

The open request is sent to the asset management component 24 and the open request identifies the user ID of the individual attempting to access the enclosure 17 and the network address of the electronic lock 40 associated with the enclosure 17. By way of non-limiting example, the network address is an IP address, media access control (MAC) address, ESN, MEIM, IMEI, uniform resource locator (URL), telephone number or RS-485 bus ID. The network address of the electronic lock 40 is tied to a physical location in the asset management component 24 of the process control system 50.

At step 4a, representing the second level of user authentication, the asset management component 24 requests the granted permissions of the user attempting to access the enclosure 17 from the access management component 20 of the process control system 50. The hierarchy of user access in the process control system 50 has roles at the highest level of the hierarchy assigned to the respective users. Each role has a permission or set of assigned permissions. By way of non-limiting example, a user may have the job of network administrator and is assigned the network engineer role.

Further, by way of non-limiting example, the permissions associated with the network engineer role in the access management component 20 are 'Access Servers,' 'Access networking,' and 'Access Control Enclosure n'. At step 4b, the asset management component 24 identifies the enclosure 17 by the electronic lock 40 network address. The asset management component 24 identifies the enclosure by accessing the equipment database 38 which contains the enclosure network address, enclosure type, and enclosure contents. At step 4c, the asset management component 24 retrieves through the API 18 the required access permissions of the respective enclosure 17 from the electronic lock 40. In step 4d of the example of FIG. 2, the enclosure permission is equal to 'Access Control Enclosure n.'

At step 5, if the 'Access Control Enclosure n' permission from the electronic lock 40 and the control system 50 match in the comparison between granted and required permissions performed by the asset management component 24, such as both the user profile and required role associated with the enclosure 17, and 'AccessControlEnclosure n' permission, an open command is sent to the electronic lock communication API 18 at step 6.

The user/cabinet combination access granted message is sent to the audit sub-component 34 by the asset management component 24 at step 7. The audit system 34 records the date, time and enclosure name for which access was granted or denied to a user.

At step 8, the communication API 18 sends an open command to the electronic lock 40 over the network 15. At step 9, the lock opens and the user has access to the contents of the enclosure 17. Physical access to the contents of the enclosure 17 is tied to the particular job function of the user in this manner.

At step 10, the user accesses the enclosure 17 to perform maintenance or various other functions. At step 11, the user closes the enclosure 17. At step 12, the electronic lock 40 contacts the asset management component 24 over network 15 with a closed message. The communication API at step 13 sends the closed message to the asset management component 24. The closed message contains the user ID and the address of the electronic lock 40. At step 14, the user/cabinet combination access complete message is sent to the audit sub-component 34.

The electronic locks 40 installed with the respective enclosures 17 that house the network servers and associated hardware are configured with the required permission of 'AccessControlEnclosure n,' are accessible to the user having the network engineer role. In this manner, the electronic lock authentication is integrated with the process control system authentication, unifying the user's job function with access to physical control system components. Typically, the network administrator accesses the network servers via logging on to the distributed control system. The example of the definition of the roles and permissions provided herein is just one way that the access management component 20 defines customer specific permissions. If should be understood that other definitions are available in the access management component 20 and that the above is presented by way of non-liming example.

Figure 4:
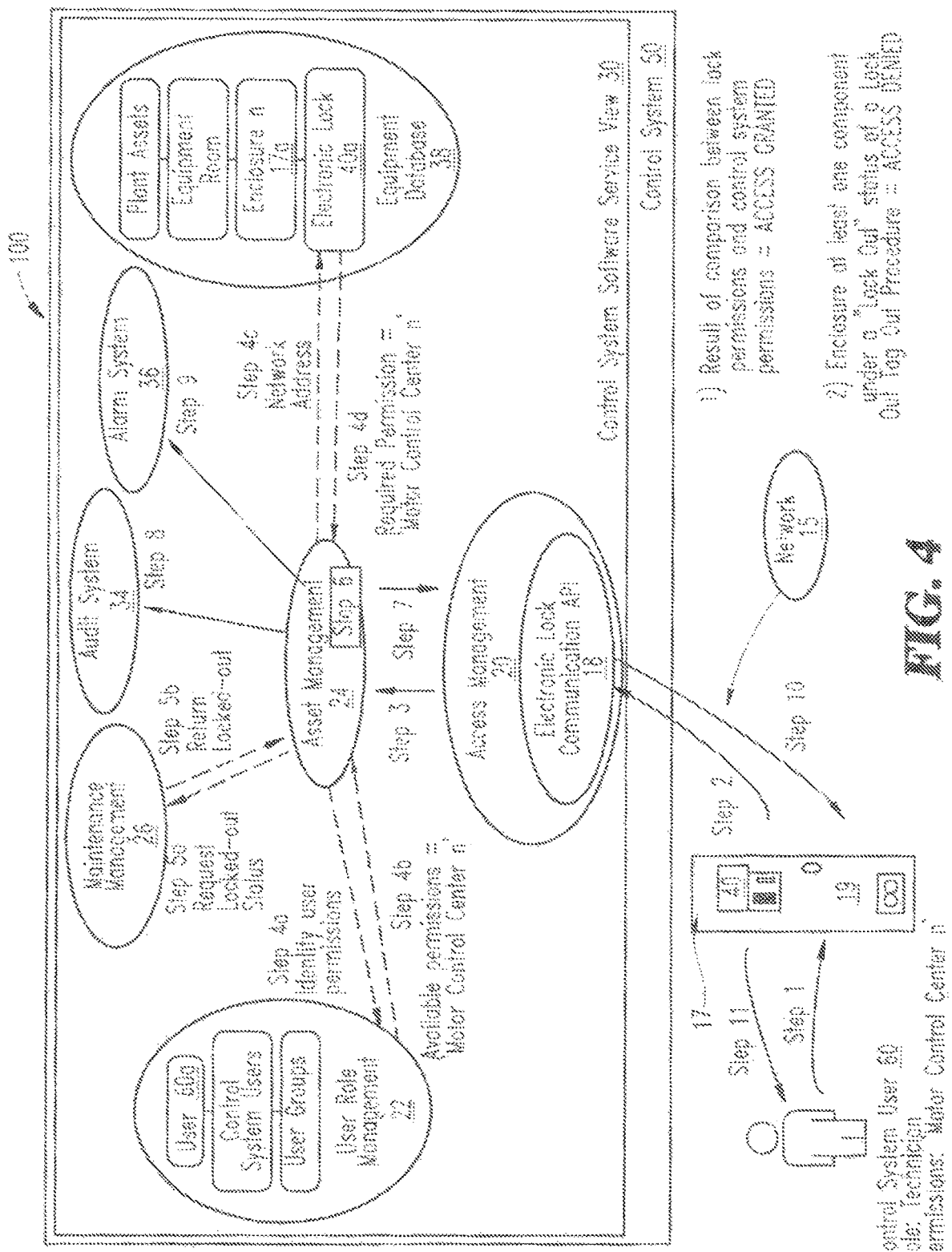
FIG. 4 is a schematic of the system of FIG. 3 in which a motor control center is housed in the enclosure and is locked out under a lock/out tag out procedure.

Another example is a user having the job function of a technician as depicted in FIG. 4. The technician is responsible for checking wiring, changing out I/O cards, and generally maintaining the process control system 50.

Using the system 100, access rights can delineate between enclosure housings and other types of components including but not limited to termination and safety system components. For example, a user is assigned the role of technician in the access management component 20 of the process control system 50 and the technician role contains a permission equal to 'AccessInstrumentation.'

The technician role, as defined in the access management component 20, provides access to enclosures including a marshalling cabinet and a transmitter cabinet. The marshalling cabinet contains the terminations of all the field wires that can be connected to field hardware, such as a fieldbus. For example, the marshalling cabinet may employ sub-clustered input/output (I/O) assemblies connected to their host controllers via cable, fiber-optic or wireless industry-standard fieldbuses. The transmitter cabinet contains transmitters that have input/output circuitry for coupling to a process control loop.

The asset management component 24 obtains the required permissions for the enclosure from the electronic lock 40. The asset management component 24 retrieves the required permission of 'AccessInstrumentation' from the electronic lock 40. The asset management component 24 compares the required permission for the technician role with the permission of the electronic lock and determines that the permissions are equivalent. The technician is granted access to the respective marshalling and transmitter cabinets.

Figure 3:
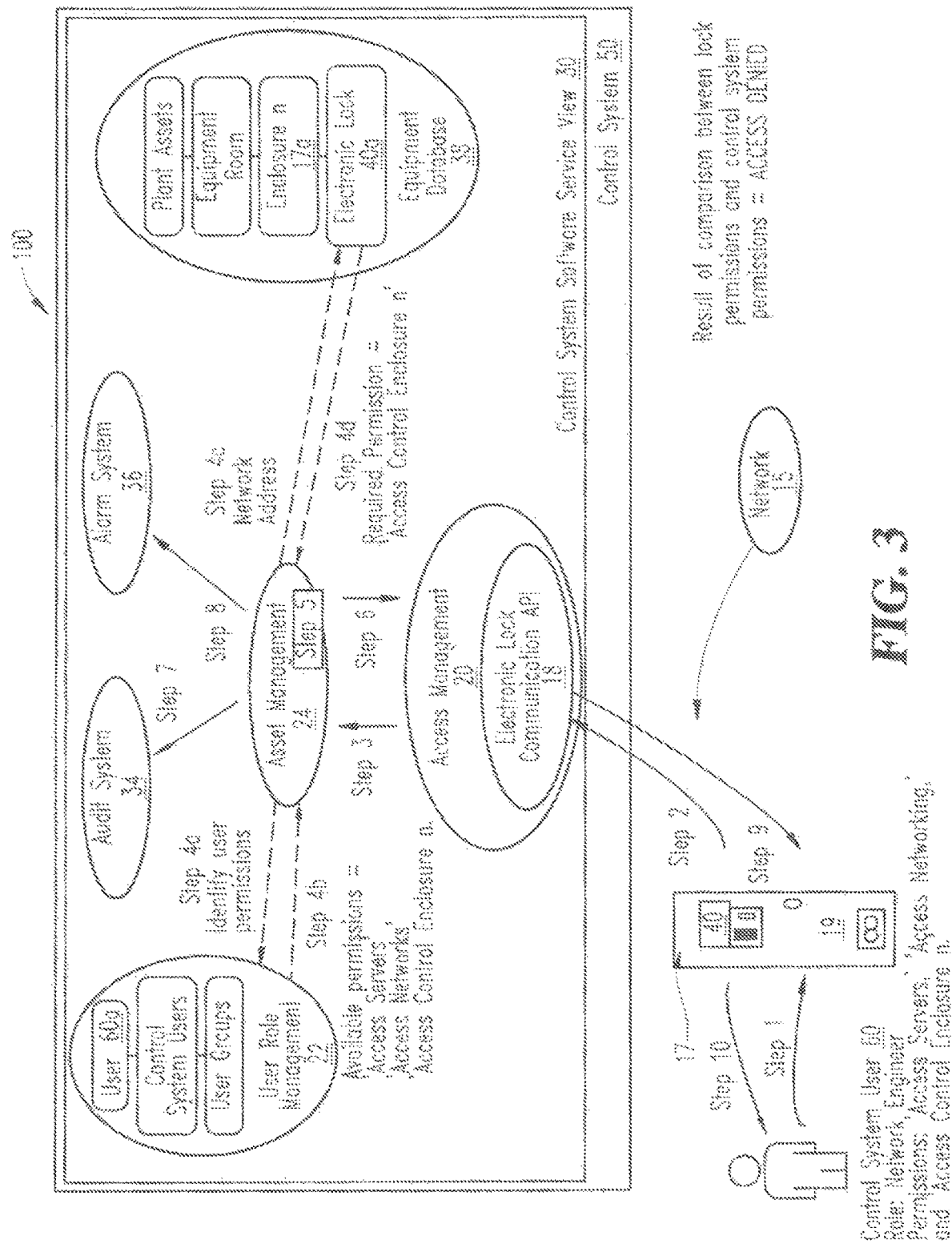
FIG. 3 is a schematic of the system of FIG. 2 in which a user is denied access to enclosures containing at least one physical component of a process control system.

With reference now to FIG. 3, a user authentication sequence is shown wherein a user is denied access to the enclosure 17. The user has the network engineer role with the permission of 'AccessControlEnclosure n' and the required enclosure permission is 'AccessTransmitterEnclosure n.' The steps 1-5 are the same as the access granted scenario of FIG. 2 described previously.

However, in the present example, at step 5, the user permission of 'AccessControlEnclosure n' is compared to the enclosure 17 permission 'AccessTransmitterEnclosure n' by the access management component 20 and the permissions are determined to be different. At step 6, a denied command is sent by the asset management component 24 to the communication API 18. At step 7, the user/enclosure access denied message is sent to the audit system 34.

Further, at step 8, an unauthorized access attempt alarm is sent to the alarm system 36 from the asset management component 24. At step 9, an access denied message is sent from the access management component 20 via the communication API 18 over network 15 to the electronic lock 40. At step 10, the electronic lock 40 interface displays an access denied message to the user.

With reference now to FIG. 4, the maintenance management component 26 of the process control system 50 is depicted along with other process control system components 20, 22, 24, 38 and has the same steps 1-4 as the process of FIG. 3. The maintenance management component 26 has work orders associated with equipment and components contained in corresponding enclosures 17 as well as information on the lock out/tag out status of each enclosure 17. As is known by one skilled in the art, a lock out/tag out is a safety procedure which is used in industry and research settings to ensure that dangerous machines are properly shut off and not started up again prior to the completion of maintenance or servicing work. The lock out/tag out procedure requires that hazardous power sources be "isolated and rendered inoperative" before any repair work is started. Equipment such as motor control centers, switchgear having cubicles housing circuit breakers and other electrical equipment have energized circuitry in enclosures that are managed by lock out/tag out procedures.

At step 5, (5a request lockout; 5b return locked out) the asset management component 24 requests lock out/tag out information from the maintenance management component 26 for the enclosure 17. The maintenance management component 26 transmits the lock out/tag out data equal to 'yes' to the asset management component 24. The asset management component 24 at step 6, compares the electronic lock 40 permissions with the enclosure 17 permissions and determines that the user is denied or granted access to the enclosure 17. In the example shown in FIG. 4, the user would be granted access to the enclosure 17, however, the asset management component 24 additionally checks the lock out/tag out status of the enclosure 17 and determines that the enclosure 17 is under a 'lock out' status.

At step 7, a denied command is sent to the communication API 18. At step 8, a user/enclosure/lockout access denied massage is sent to audit sub-component 34. At step 9, an unauthorized access attempt alarm is sent to the alarm sub-component 36. At step 10, the communication API 18 sends an access denied message to the electronic lock 40 over the network 15. At step 11, the electronic lock 40 displays an access denied message to the user. The access denied message may also state that the enclosure is locked out and refer to the work order number under which the enclosure 17 has received a 'lock out' or 'locked out' status in the maintenance management component 26. In one embodiment, the maintenance management component 26 is part of the process control system 50. In other embodiments, the maintenance management component 26 is a stand-alone system such as an SAP system having a plant maintenance (PM) module or a Maximo system that is interfaced with the process control system 50.

In one embodiment, the enclosure 17 has sub-enclosures and the enclosure 17 and sub-enclosures each have their own electronic lock 40. In that same embodiment, a job function/role electrician configured in the process control system 50 can access the main enclosure 17, but cannot access the sun-enclosures and a job function/role of technician would be able to access both the main enclosure 17 that houses circuit breakers and sub-enclosures housing logic control circuit boards. It should be understood that the main enclosure 17 may be housed in the single location such as a room and that the sub-enclosure is housed inside the main enclosure 17. Each access point of entry for providing physical access to process control equipment and/or other equipment associated therewith includes the single location or room having a separate electronic lock installed at the access point to each of the main enclosure 17 and sub-enclosure.

In one aspect, the present disclosure discloses a system for administering physical access to at least one component of a process control system, having an electronic lock for restricting access to an enclosure containing said at least one component, said electronic lock associating a physical access permission with an enclosure and providing a first level of user authentication; a communication API for transmitting open and close requests between an access management component of the control system and the electronic lock; an asset management component for managing user roles and associated permissions in the process control system; and wherein the asset management component of the process control system includes a second level of user authentication wherein the at least one component physical access permission as defined in the access management component is compared with process control system permissions defined in the asset management component.

In refined aspect, the system further comprises an audit system for tracking date, time and enclosure name when access is granted to a user; an audit system for tracking date, time and enclosure name when access is denied to a user; wherein the enclosure is a single location in a building; wherein the enclosure has at least one sub-enclosure housed therein, the sub-enclosure having an electronic lock installed thereon for restricting physical access to at least one process control component inside the sub-enclosure; wherein the sub-enclosure includes a different permission criteria than the enclosure.

In another aspect, the present disclosure includes a method for controlling physical access to at least one component of a process control system, comprising receiving user credentials by an electronic lock installed with an enclosure housing at least one component of the process control system; transmitting the user credentials and a lock address from the electronic lock to an access management component of a the process control system; requesting user granted permissions by the access management component from the process control system asset management component; identifying the enclosure by using the locking system network address; receiving physical access permissions of the enclosure by the asset management component from the electronic lock; validating by the asset management component whether the received physical access permissions are equivalent to the user granted permissions in the control system; providing access to the at least one component inside the enclosure if the user is validated for access to the enclosure contents, and preventing access if the user is not validated for access to the enclosure.

In refined aspects, transmitting an unauthorized access attempt alarm from the asset management component to an alarm system when a user is denied access to the enclosure; transmitting a user/enclosure access denied message to an audit system when a user is denied access to the enclosure; recording in an audit system the tracking date, time and enclosure name for when enclosure access is granted to a user; recording in an audit system the tracking date, time and enclosure name when enclosure access is denied to a user.

In yet another aspect, the present disclosure includes a system for restricting physical access to at least one process control component inside an enclosure, the system comprising the enclosure, an electronic lock installed with the enclosure, a process control system having an access management component and an asset management component stored on a computer readable medium having computer readable instructions thereon that when executed by a processor, carry out the following steps: receiving, by the access management system through an application programming interface, user credentials presented to the electronic lock and the corresponding electronic lock address; receiving, by the asset management system, the user credentials and electronic lock address from the access management component; retrieving user role permissions defined by the asset management system using the user credentials; retrieving, by the asset management system, required permissions for accessing the at least one process control component housed in the enclosure; comparing, by the asset management system, the user role permission with the required access permissions for the at least one process control component; and transmitting an open request over the application programming interface to the electronic lock with the user roles and required permissions; and permitting access if the user roles are equivalent and denying access if they are not equivalent.

In refined aspects, the steps further comprise: retrieving a lockout status in the asset management system for the enclosure; and transmitting an open request to the enclosure electronic lock if the lockout status parameter is negative and restricting access to the enclosure if the lockout status parameter is affirmative.

In yet another aspect, the present disclosure includes a system comprising: a first enclosure having a first component for a computer system disposed therein; a first electronic lock configured to control physical access to the first component within the first enclosure; a first set of access permissions associated with the first electronic lock; a second enclosure disposed within the first enclosure, the second enclosure having a second component for a computer system disposed therein; a second electronic lock configured to control physical access to the second component within the second enclosure; and a second set of access permissions associated with the second electronic lock.

In refined aspects, the first set of access permissions is different from the second set of access permissions; user credentials operable to define access permissions for a user; physical access to the first and second enclosures is determined based on comparisons between the access permissions of the first and second sets respectively and the access permissions defined by the credentials; physical access to the component in the second enclosure is permitted if the access permission defined by the user credentials satisfies the permission requirements of the first and second sets of enclosure permissions; the user credentials operate to permit the user to electronically access the computer component located within the enclosure; additional enclosures with additional computer components disposed within the first and/or the second enclosures; an audit system operable for logging data related to both successful and unsuccessful access events into each enclosure; including a control system; an access management component defined in the control system configured to tie the first enclosure, the first component and the first electronic lock to a first logical representation within the control system; wherein the access management component of the control system is configured to tie the second enclosure, the second component and the second electronic lock to a second logical representation.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system for administering physical access to at least one component of a process control system, comprising:
   an electronic lock for restricting access to an enclosure containing said at least one component, said electronic lock associating a physical access permission with an enclosure and providing a first level of user authentication;
   a communication API for transmitting open and close requests between an access management component of the process control system and the electronic lock; and
   an asset management component for managing user roles and associated permissions in said process control system, said asset management component being configured to identify the enclosure and request from the electronic lock, via the communication API and upon identification of the enclosure, the physical access permission for the enclosure,
   wherein said asset management component of said process control system includes a second level of user authentication wherein the at least one component physical access permission as defined in said access management component is compared with process control system permissions defined in said asset management component.

2. The system of claim 1 further comprising an audit system for tracking date, time and enclosure name when access is granted to a user.

3. The system of claim 1 further comprising an audit system for tracking date, time and enclosure name when access is denied to a user.

4. The system of claim 1 wherein the enclosure is a single location in a building.

5. The system of claim 1 wherein the enclosure has at least one sub-enclosure housed therein, said sub-enclosure having an electronic lock installed thereon for restricting physical access to at least one process control component inside said sub-enclosure.

6. The system of claim 5, wherein the sub-enclosure includes a different permission criteria than the enclosure.

7. A method for administering the system of claim 1, the method comprising:
   a. receiving user credentials by the electronic lock;
   b. transmitting, using said communication API, said user credentials and a lock address from said electronic lock to said access management component;
   c. requesting the process control system permissions by said access management component from said asset management component;
   d. identifying said enclosure by using said locking system network address;
   e. receiving the physical access permission of said enclosure by said asset management component from said electronic lock;
   f. validating, by a comparison by said asset management component, whether said received physical access permissions is equivalent to said process control system permissions;
   g. communicating an open command to said electronic lock of said enclosure if said user is validated, and preventing access if said user is not validated for access to said enclosure.

8. The method of claim 7, further comprising: h. transmitting an unauthorized access attempt alarm from said asset management component to an alarm system when a user is denied access to said enclosure.

9. The method of claim 7, further comprising: h. transmitting a user/enclosure access denied message to an audit system when a user is denied access to said enclosure.

10. The method of claim 7, further comprising: h. recording in an audit system the tracking date, time and enclosure name for when enclosure access is granted to a user.

11. The method of claim 7, further comprising: h. recording in an audit system the tracking date, time and enclosure name when enclosure access is denied to a user.

12. A method for administering the system of claim 1, the method comprising:
- a. receiving, by the access management system through the communication API, user credentials presented to said electronic lock and a corresponding electronic lock address;
- b. receiving, by the asset management system, the user credentials and the electronic lock address from the access management component;
- c. retrieving the process control system permissions, the process control system permissions being user role permissions defined by the asset management system using the user credentials;
- d. retrieving, by the asset management system, the physical access permission;
- e. comparing, by the asset management system, the process control system permissions with the physical access permission;
- f. transmitting, when the process control system permissions satisfies the physical access permission, an open request over the communication API to the electronic lock; and
- g. denying access if the process control system permissions do not satisfy the physical access permission.

13. The system of claim 12, wherein the steps further comprise:
- a. retrieving a lockout status in the asset management system for the enclosure from a maintenance management component; and
- b. transmitting an open request to the enclosure electronic lock if the lockout status parameter is negative and restricting access to the enclosure if the lockout status parameter is affirmative.

* * * * *